No. 874,045. PATENTED DEC. 17, 1907.
N. B. WALES.
MECHANICAL MOVEMENT.
APPLICATION FILED JAN. 4, 1907.

2 SHEETS—SHEET 1.

Witnesses:
K. C. Dugan
Geo. N. Goddard

Inventor:
Nathaniel B. Wales
by Ira L. Fish
Attorney.

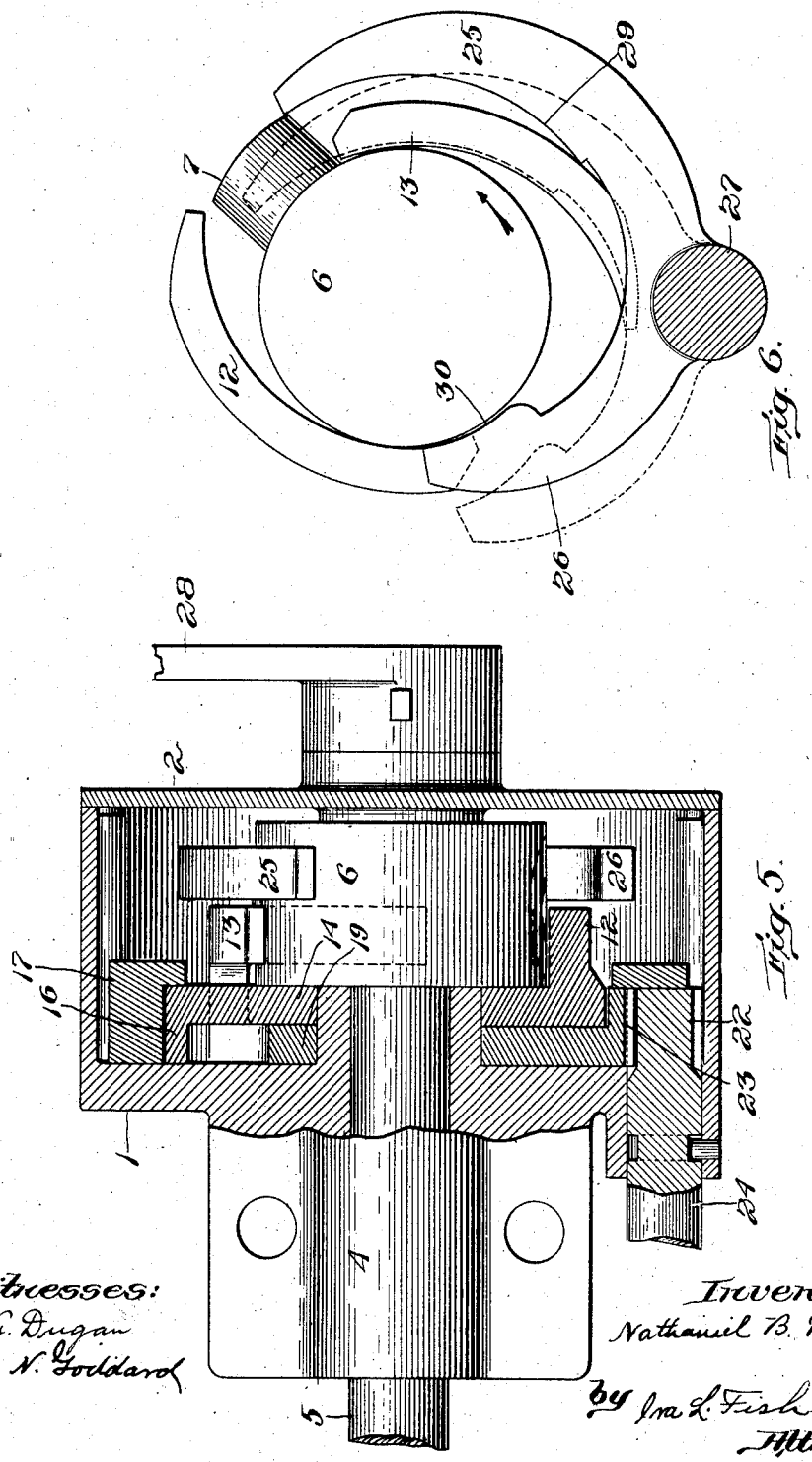

UNITED STATES PATENT OFFICE.

NATHANIEL B. WALES, OF BRAINTREE, MASSACHUSETTS.

MECHANICAL MOVEMENT.

No. 874,045.            Specification of Letters Patent.            Patented Dec. 17, 1907.

Application filed January 4, 1907. Serial No. 350,739.

*To all whom it may concern:*

Be it known that I, NATHANIEL B. WALES, citizen of the United States, and resident of Braintree, Massachusetts, Norfolk county, have invented certain new and useful Improvements in Mechanical Movements, of which the following is a specification.

The object of the invention is to provide a simple and efficient mechanism for quickly shifting a member and more especially a mechanism which may be utilized with advantage for operating valves for steam engines, air compressors or similar machines where it is desirable to quickly open or close the valve.

In practicing the invention the member which is connected either mediately or immediately with the valve or other member to be operated is quickly shifted at the proper time by means of a plunger which is yieldingly mounted in a moving carrier and is retracted and released by a stationary cam along which the plunger or a part connected therewith is carried by the movement of the carrier.

In case the invention is embodied in a mechanism by which the valve or other part to be operated is to be shifted in opposite directions, as for instance to open and close a valve, two stationary cams are provided and these cams are arranged to successively act upon the plunger so that the plunger is retracted and released by one cam to shift the member in one direction and is then retracted and released by the other cam to shift the member in the opposite direction. I also prefer to provide means for varying the position of either one or both of the cams which retract and release the plunger and which therefore determine the point or points in the operation of the mechanism at which the plunger is released and the shiftable member operated and the provision of such means forms one of the features of my invention.

The various features of the invention will be readily understood from the following detailed description of one form of mechanism in which I have embodied them and which is shown in the accompanying drawings.

Figure 2:
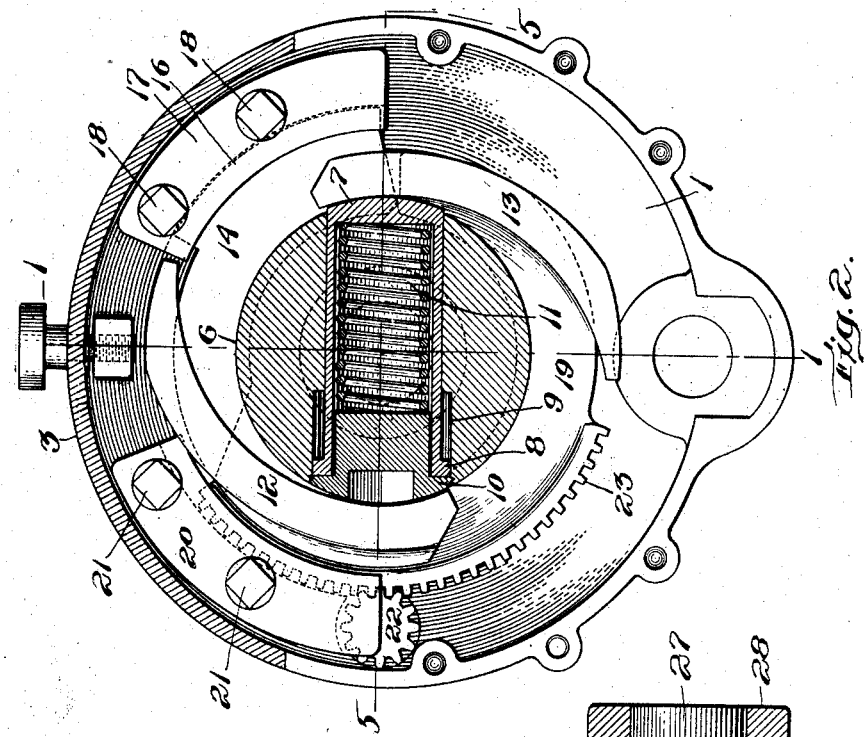
Figure 1:
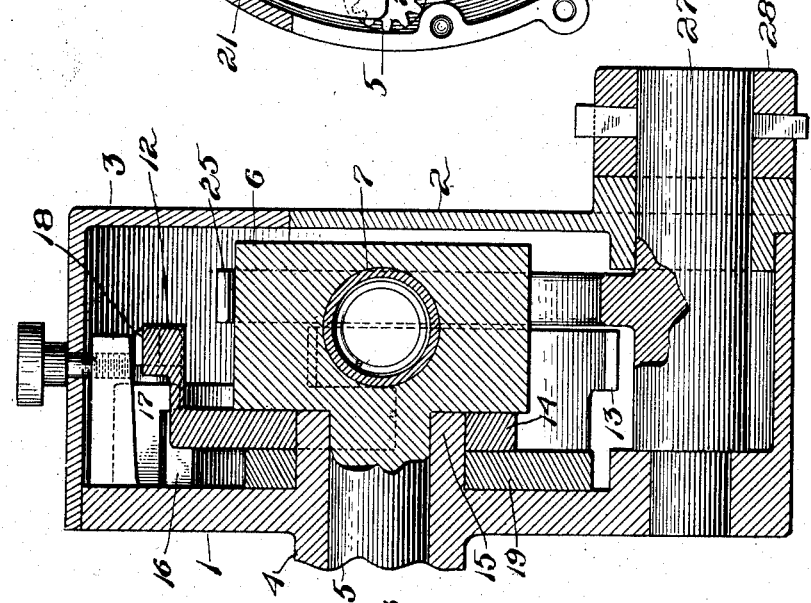
Figure 3:
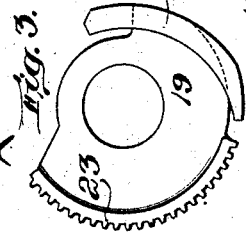
Figure 4:
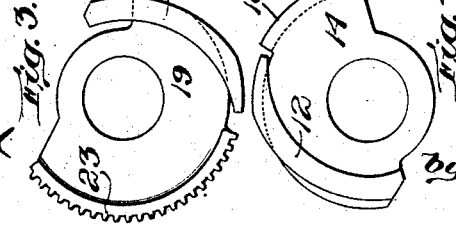

In these drawings Figure 1 is a vertical sectional view through the center of the mechanism or on line 1—1 Fig. 2. Fig. 2 is an elevation looking toward the left in Fig. 1 the front of the casing in which the parts are mounted and certain of the parts being removed for the sake of clearness and the carrier for the plunger being shown in section. Figs. 3 and 4 are details of the carriers on which the stationary cams are mounted. Fig. 5 is a horizontal sectional view on line 5—5 Fig. 2; and Fig. 6 is an elevation showing the arrangement of the retracting and releasing cams and of the yoke which is shifted by the release of the plunger.

In practicing the invention as shown in the accompanying drawings the various parts of the mechanism are mounted within a casing 1 provided with a front plate 2 and with a cap 3. Mounted within a bearing 4 in the casing is a shaft 5 which is provided at its inner end with a cylindrical head 6 which forms a carrier for the plunger 7. The plunger 7 is mounted within a cylindrical bore in the head 6 and extends diametrically across the head. The inner end of the plunger is provided with a flange 8 arranged to work within a recess 9 formed at the rear of the diametrical bore in the head. The plunger is retained within the head by means of a plug 10 screwed into the outer end of the recess 9 and the plunger is forced yieldingly outward by means of a spring 11 arranged within the plunger and bearing against the end of the plug 10 and against the bottom of the recess formed within the plunger. While I prefer to use a spring for forcing the plunger outward it will be understood that the plunger may be forced outward by other elastic forces as for instance by compressed air or other gas.

As the shaft 5 and carrier 6 revolve the plunger 7 is retracted or forced into the head and then suddenly released by means of two cams 12 and 13. The cam 12 is formed upon a cam carrying disk 14 which is mounted upon a hub 15 projecting into the casing 1 and arranged concentric with the shaft 5. The cam carrying disk 14 is provided with a rearwardly projecting flange 16 which engages the inner face of the casing and the disk is held firmly in position by means of a clamping plate 17. This clamping plate is held firmly against the outer face of the disk above the flange 16 by means of bolts 18. By means of the clamping plate the cam carrying disk 14 and cam 12 carried thereby may be firmly held in any position into which they may be adjusted.

The cam 13 is formed upon a cam carrying disk 19 which is also mounted upon the hub 15, the disk being held in position on the hub by means of the disk 14 and also by a plate 20 which overlies the edge of the disk. This cam carrying disk 19 may be clamped in adjusted position by means of the clamping plate 20 and bolts 21 or the position of the cam may be varied during the operation of the mechanism by means of a pinion 22 arranged to engage a segmental gear 23 formed on the disk. The pinion 23 is formed on the end of a rod or shaft 24 which may be connected to any suitable governing mechanism in case it is desired to automatically shift the position of the cam 13.

While the cam 13 is the only cam which in the construction shown is connected with means for automatically varying its position it will be understood that the cam 12 may be connected with similar mechanism if found desirable, the construction of which may be substantially the same as that shown in connection with the cam 13.

In the construction shown the member which is shifted by the plunger 7 when it is released by either of the cams 12 and 13 is in the form of a yoke provided with arms 25 and 26 which lie on opposite sides of the plunger carrying head 6. This yoke is formed upon a shaft 27 mounted within the casing and carrying at its outer end an arm 28 which may be connected in any suitable manner to the valve or other member which is to be operated. The arm 25 of the yoke is arranged to be engaged by the plunger 7 when it passes off of the end of the cam 13 and this arm is provided with an elongated engaging surface 29 with which the plunger engages. This engaging surface is so arranged that it is concentric with the carrying head 6 when the arm 25 has been shifted by the plunger 7 as indicated in full lines in Fig. 6. This engaging surface is of sufficient extent to be engaged by the plunger 7 whatever the adjustment or position of the cam 13. The arm 26 of the yoke is provided with a short engaging surface 30 which is so arranged that it will be operated upon by the plunger 7 when the plunger rides off of the end of the cam 12. This engaging surface is comparatively short since in the construction shown the position of the cam 12 is not supposed to be varied to any great extent.

Supposing the parts to be in the position indicated in Fig. 6 in which the plunger 7 has been released by the cam 13 and has been projected by the spring 11 to shift the arm 25 of the yoke into the position indicated in full lines and assuming that the plunger carrying head 6 is rotated in the direction of the arrow Fig. 6, then as the rotation of the head continues the plunger will ride along the cam 12 by which it will be retracted or forced inward against the tension of the spring 11 and retained in its retracted position until it runs off of the end of the cam 12. When the plunger runs off the end of the cam 12 it will be released and will be suddenly projected by its spring. When the plunger is thus projected it will act upon the engaging surface 30 of the yoke shifting the yoke toward the left and bringing the arms 26 and 25 into the dotted line position of Fig. 6. Now as the plunger carrying head 6 rotates the plunger will ride along the cam 13 by which it will be retracted or forced inward against the tension of the spring 11 and will be retained in its retracted position until it runs off the end of the cam. When the plunger runs off the end of the cam 13 it will act upon the engaging surface 29 of the arm 25 shifting the yoke to the right and returning the parts to the full line position of Fig. 6. Thus during the rotation of the plunger carrying head the plunger will be successively retracted and released by the cams and when released will act to shift the yoke first in one direction and then in the other. By shifting or adjusting the cams 12 and 13 the timing of the release of the plunger 7 and therefore of the shifting movements of the yoke and parts connected therewith may be varied as desired.

When the mechanism is to be utilized for opening and closing a valve for a steam engine or an air expanding or compressing mechanism, the opening or closing of the valve as the case may be may be regulated automatically by shifting the cam 13 through the operation of the shaft 24. For instance if the mechanism is connected to operate the valve of the steam engine the cam 12 may be set to open the valve at a definite point in the stroke of the piston and the cam 13 may be adjusted to give the desired cut off. In this case the shaft 24 may be connected with the governing mechanism for the engine and thus the cam 13 be shifted to vary the cut off according to the conditions under which the engine is running.

The casing within which the mechanism is mounted may be filled or partially filled with oil if found desirable to reduce the friction and to cushion to some extent the sudden movement of the yoke when operated by the release of the plunger. The cap 3 may be secured in position upon the top of the casing by means of a screw 31 arranged to engage a lug 32 projecting inward from the rear wall of the casing.

While I prefer the specific construction and arrangement of parts shown and described it will be understood that this construction and arrangement is not essential and is shown merely for the purpose of illustrating one form of mechanism in which the features of the invention may be embodied and the form and arrangement in which I prefer to embody them.

Without attempting to point out in detail the various constructions and arrangements in which the invention may be embodied, what I claim and desire to secure by Letters Patent is:—

1. A mechanical movement comprising a carrier, a plunger yieldingly mounted in the carrier, two cams arranged to successively retract and release the plunger, and a member shifted by the plunger when released by the cams.

2. A mechanical movement comprising a carrier, a plunger yieldingly mounted in the carrier, a cam for retracting and releasing the plunger, a member shifted by the plunger, and means for varying the position of the cam.

3. A mechanical movement comprising a carrier, a plunger yieldingly mounted in the carrier, two cams arranged to successively retract and release the plunger, members shifted by the plunger when released by the cams, and means for varying the positions of the cams.

4. A mechanical movement comprising a carrier, a plunger yieldingly mounted in the carrier, a cam for retracting and releasing the plunger, a member shifted by the plunger, and mechanism for varying the position of the cam during the movement of the carrier.

5. A mechanical movement comprising a carrier, a plunger yieldingly mounted in the carrier, two cams arranged to successively retract and release the plunger, members shifted by the plunger when released by the cams, and mechanism for varying the position of one of the cams during the travel of the carrier.

6. A mechanical movement comprising a rotary carrier, a plunger mounted in the carrier to yield radially thereof, a cam for retracting and releasing the plunger, and an arm shifted by the plunger when released by the cam.

7. A mechanical movement comprising a rotary carrier, a plunger yieldingly mounted in the carrier, two cams arranged about the carrier for retracting and releasing the plunger, a yoke provided with arms arranged to be alternately engaged by the plunger when released by the cams.

8. A mechanical movement comprising a rotary carrier, a plunger yieldingly mounted in the carrier, cams arranged to retract and release the plunger, a yoke provided with arms arranged to be alternately engaged by the plunger when released by the cams, and mechanism for shifting one of the cams about the axis of the carrier.

9. A mechanical movement comprising a rotary carrier, a spring operated plunger mounted in the carrier, two cams arranged in the path of the plunger to retract and release the same, a yoke provided with arms arranged to be engaged by the plunger when released by the cams.

In witness whereof, I have hereunto set my hand, this 2nd day of January 1907.

NATHANIEL B. WALES.

In the presence of—
　IRA L. FISH,
　KATHARINE A. DUGAN.